United States Patent
Johnson et al.

(10) Patent No.: US 6,810,448 B1
(45) Date of Patent: Oct. 26, 2004

(54) METHOD AND APPARATUS FOR PROCESSING CHAIN MESSAGES (SGL CHAINING)

(75) Inventors: Stephen B. Johnson, Colorado Springs, CO (US); Timothy E. Hoglund, Colorado Springs, CO (US); Guy W. Kendall, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 483 days.

(21) Appl. No.: 09/848,569

(22) Filed: May 2, 2001

(51) Int. Cl.$^7$ .................. G06F 13/14; G06F 13/38
(52) U.S. Cl. ............... 710/52; 710/24; 710/36; 710/310; 709/216
(58) Field of Search .............. 710/5, 24, 36, 710/52, 100, 310; 709/216

(56) References Cited

U.S. PATENT DOCUMENTS 4,467,411 A * 8/1984 Fry et al. ................ 711/136
5,278,834 A * 1/1994 Mazzola ................ 370/469
5,991,797 A * 11/1999 Futral et al. ............ 709/216
6,336,150 B1 * 1/2002 Ellis et al. .................. 710/5
6,445,680 B1 * 9/2002 Moyal .................... 370/236

OTHER PUBLICATIONS

"Intelligent I/O ($I_2O$) Architecture Specification", Version 1.5, Mar. 1997, pp. 1–1 to 6–127.

"Intelligent I/O ($I_2O$) Architecture Specification", Version 2.0, Mar. 1999, pp. 1–1 to 7–125.

* cited by examiner

Primary Examiner—Rehana Perveen
(74) Attorney, Agent, or Firm—Christopher P. Maiorana, PC

(57) ABSTRACT

A message-based I/O architecture comprising a list describing one or more source buffers and a message header. The list may be segmented in multiple memory locations. The message header may be configured to (i) indicate whether the list is segmented and (ii) provide information for linking the list when the list is segmented.

24 Claims, 2 Drawing Sheets

METHOD AND APPARATUS FOR PROCESSING CHAIN MESSAGES (SGL CHAINING)

FIELD OF THE INVENTION

The present invention relates to a message-based I/O architecture generally and, more particularly, to a method and/or apparatus for processing chain messages.

BACKGROUND OF THE INVENTION

A device driver interfaces a particular hardware device to a specific operating system (OS). The device driver can be split into two modules: one that contains all the OS-specific code and the other for hardware-specific code. The OS-specific module of the device driver can convert operating system calls into I/O transactions. The hardware-specific module of the driver contains vendor-specific code that converts the hardware level interface of the hardware device to the functions required for the particular class of device.

A message-based interface can be used to enable direct message passing between any two device driver modules for a particular class of I/O (message class). Message classes can include (i) LAN ports, such as Ethernet or Token Ring controllers; (ii) random block storage devices, such as hard disk drives and CD-ROM drives; (iii) sequential storage devices and variable block-size devices, such as tape drives; (iv) host bus adapters such as SCSI ports; (v) SCSI devices; (vi) peer data services; (vii) hot plug controller; (viii) IDE controllers and devices; (ix) floppy disk controllers and devices; (x) Fibre Channel; and (xi) WAN ports, such as ATM controllers.

When information is sent to a storage controller, the information frequently does not fit into a single message frame. The information can be split into multiple message frames. When the information is split (segmented) into multiple frames, a "link" or "chain" is needed to re-assemble the information from the multiple message frames.

Conventional hardware and/or firmware solutions traverse a scatter gather list (SGL) to find a "link" or "chain". The conventional methods for finding the link or chain can require significant processor and hardware overhead. Conventional message chaining is limited to extending SGLs.

SUMMARY OF THE INVENTION

The present invention concerns a message-based I/O architecture comprising a list describing one or more source buffers and a message header. The list may be segmented in multiple memory locations. The message header may be configured to (i) indicate whether the list is segmented and (ii) provide information for linking the list when the list is segmented.

The objects, features and advantages of the present invention include providing a method and apparatus for processing chain messages that may (i) simplify checks for chains for dedicated hardware components and embedded firmware, (ii) provide an indication that a chain exists in a message frame header, and/or (iii) provide a location where chain information is located.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
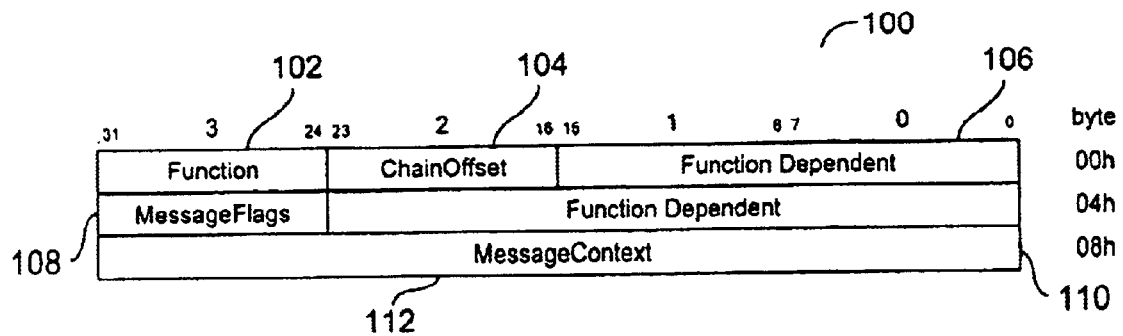
FIG. 1 is a block diagram illustrating a message header in accordance with a preferred embodiment of the present invention.

Referring to FIG. 1, a block diagram illustrating a message header 100 implemented in accordance with a preferred embodiment of the present invention is shown. The message header 100 may be implemented as a number of bytes at the beginning of a message frame. In one example, the message header 100 may be implemented as the first 12 bytes of a message frame. The message header 100 may comprise a field 102, a field 104, a field 106, a field 108, a field 110, and a field 112. The field 102 may be implemented as a function field. The field 104 may be implemented as a chain offset field. The field 106 may be implemented as a function dependent field. The field 108 may be implemented as a second function dependent field. The field 110 may be implemented as a message flags field. The field 112 may be implemented as a message context field.

The field 102 may contain a function number for a particular message. The function number may be used to differentiate one message from another message. The function number may be used to set a format for a remainder of the message.

The field 104 may contain information indicating whether a scatter gather list (SGL) associated with the message header 100 is segmented into multiple memory locations. When the SGL is not segmented, the field 104 may contain a null value. When the SGL is segmented, the field 104 may contain an offset from the beginning of the message frame to a location of a scatter gather (SG) element containing chaining information. In one example, the offset may be expressed as a number of 32-bit words.

The fields 106 and 108 may be formatted to support the function specified by the field 102. The field 110 may contain a number of bits indicating a state of a number of message flags. In one example, a reserved bit may be set to a logical LOW ("0"). However, other states for reserved bits may be identified in specific messages.

The field 112 may contain a value specified by a host driver to uniquely identify a particular message when processing replies. The value specified by the host is generally returned unmodified in a reply. However, when a protocol that uses context replies is implemented, the values that may be used in the field 112 may be restricted. In particular, the protocol may restrict the use of one or more bits of the field 112. For example, a protocol for SCSI IO message passing may use a number of bits of the field 112 (e.g., the upper three bits) to implement (i) an address field (e.g., one or more bits that indicate whether a reply is an address reply or a context reply) and (ii) a type field (e.g., one or more bits that indicate a type of the context reply) when the reply is a context reply.

In one example, the address field may be implemented as 1-bit and the type field may be implemented as two bits. When the address field or bit is set (e.g., a non-null value or a logical "1"), the reply may be an address reply and the rest of the field 112 may be a 32-bit address that is shifted left by one bit. When the address field or bit is not set (e.g., a null value or a logical "0"), the reply may be a context reply and the type field or bits may describe a format for context information in the remainder of the field 112. However, other conventions may be implemented to meet the design criteria of a particular application.

A scatter gather list (SGL) may be used to describe any number of source buffers. The SGL is generally composed of a structured list of scatter gather (SG) elements. In one example, three types of SG elements may be implemented: a simple element, a chain element, and a transaction context element. However, other types of SG elements may be implemented to meet the design criteria of a particular application. The simple element may be implemented as an address length pair that may be used to describe a physically contiguous block of memory. A data buffer as used herein refers to a consecutive list of simple elements bounded by an end of buffer flag. The chain element may be implemented as an address length pair that may be used to link an SGL that is segmented in multiple memory locations. Each physically contiguous piece of the SGL is generally called a segment. The transaction context element is generally used when multiple buffers are implemented (used).

The transaction context element may be implemented to correlate data buffers with a transaction reference. The transaction context elements may be associated with one or more simple elements. Transaction context elements associated with each simple element may provide a mechanism for the host driver to manage buffers independently of the message context. The interpretation of the transaction context may vary depending on the particular message. The transaction context element generally assigns a transaction context to the group of simple elements immediately following the transaction context element in the scatter gather list. The group of consecutive simple elements may span multiple segments. The multiple segments may be chained. The transaction context generally continues until a simple element is encountered with an End of Buffer (EOB) bit (flag) set.

The entries in a SGL are generally of the same addressable type (e.g., 32 or 64 bit). When no data transfer is associated with a given request that has an optional SGL, the SGL generally consists of a zero-length simple element with a LastElement bit, an EndOfBuffer bit, and an EndOfList bit set to an asserted logic level (e.g., a logical HIGH, or "1").

Figure 2:
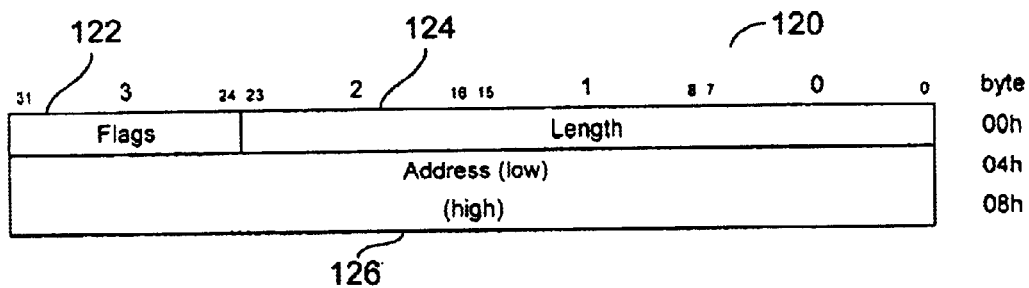
FIG. 2 is a block diagram illustrating an example of a simple scatter gather element in accordance with a preferred embodiment of the present invention.

Referring to FIG. 2, a block diagram illustrating an example of a simple SG element 120 implemented in accordance with a preferred embodiment of the present invention is shown. The simple SG element 120 may be used to identify a single buffer segment in contiguous physical memory. The simple SG element 120 may have a field 122, a field 124, and a field 126. The field 122 may be implemented as a FLAGS field. The field 124 may be implemented as a LENGTH field. The field 126 may be implemented as an ADDRESS field. The field 122 may contain a number of bits that may be used as flags. In one example, the number of bits may be eight. An example of a number of the flags that may be implemented in the field 122 may be summarized in the following TABLE 1:

TABLE 1

| Bit | Flag | Description |
| --- | --- | --- |
| 7 | LastElement | 0 - Not the last element of the current segment.<br>1 - Last non-chain element of the current segment. |
| 6 | EndOfBuffer | 0 - Not the last element of the current buffer.<br>1 - Last element of the current buffer. |
| 5, 4 | ElementType | 01 - Simple element type |
| 3 | LocalAddress | 0 - System address.<br>1 - Local address. |
| 2 | Direction | 0 - Buffer to be filled by the transaction.<br>1 - Buffer contains data. |
| 1 | AddressSize | 0 - 32 bit addressing in this element.<br>1 - 64 bit addressing in this element. |
| 0 | EndOfList | 0 - Not the last element of the entire SGL.<br>1 - Last element of the entire SGL |

The field 124 generally contains a value representing the total number of contiguous bytes in a data buffer starting at an address specified by the element. The field 126 generally contains the physical address of the first byte of the data buffer. The size of the field 126 may be based on the AddressSize bit in the field 122. When 32-bit addressing is selected, the address field is generally 32 bits wide. When 64-bit addressing is selected, the address field is generally 64 bits wide with the first 32 bits being the low order 32 bits of the address. Together, the fields 124 and 126 generally describe a contiguous buffer segment.

Figure 3:
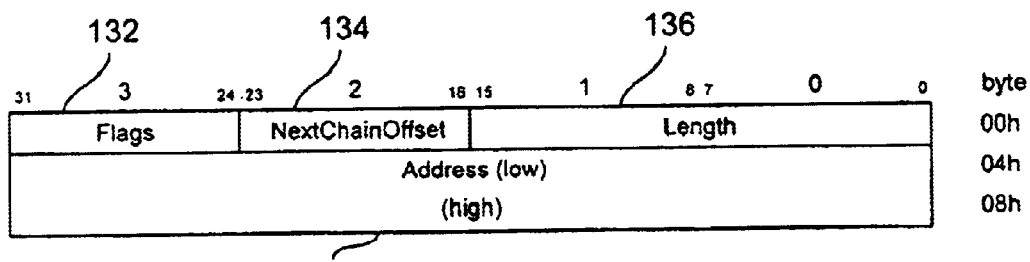
FIG. 3 is a block diagram illustrating a chain SG element in accordance with a preferred embodiment of the present invention.

Referring to FIG. 3, a block diagram illustrating a chain SG element 130 implemented in accordance with a preferred embodiment of the present invention is shown. The chain element 130 generally identifies a physically contiguous portion of memory that may contain additional information associated with a particular request. The chain element 130 may be used as part of an SGL to identify the next memory segment that continues the current SGL. An SGL may contain more than one chain element 130. When used as part of an SGL, the chain element 130 is generally physically contiguous to the last non-chain element within each chain segment.

The chain element 130 may have a field 132, a field 134, a field 136, and a field 138. The field 132 may be implemented as a FLAGS field. The field 134 may be implemented as a next chain offset field. The field 136 may be implemented as a length field. The field 138 may be implemented as an address field.

The field 132 may contain a number of bits that may be used as flags. In one example, the number of bits may be eight. An example of a number of the flags that may be implemented in the field 132 may be summarized in the following TABLE 2:

TABLE 2

| Bit | Flag | Description |
| --- | --- | --- |
| 7, 6 | Reserved | generally set to a logical LOW, or "0." |
| 5, 4 | ElementType | 11 - Chain element type |
| 3 | LocalAddress | 0 - System address.<br>1 - Local address. |
| 2 | Direction | 0 - Buffer to be filled by the transaction.<br>1 - Buffer contains data. |
| 1 | AddressSize | 0 - 32 bit addressing in this element.<br>1 - 64 bit addressing in this element. |
| 0 | Reserved | generally set to a logical LOW, or "0." |

The field 134 generally contains an offset of the next chain element located in the segment identified by the current chain element. The offset may be expressed, in one example, as a number of 32-bit words. When the field 134 is zero, no chain element generally exists within the next segment. The field 136 generally contains the number of bits in the next SGL segment.

The field 138 generally contains the physical address of the first byte of the next SGL segment. The address is generally aligned on a 4 byte boundary (e.g., the lowest two address bits set to 00b). The size of the address field is generally based on the AddressSize bit in the field 132. When 32-bit addressing is selected, the address field is generally 32 bits wide. When 64-bit addressing is selected, the address field is generally 64 bits wide with the first 32 bits being the low order 32 bits of the address.

Chained lists are generally used when a complete SGL for an IO will not fit into a single message frame. To continue the list, the host driver generally uses other memory locations and continues building the SGL in the next memory location. The chain memory generally does not have to be physically contiguous with the message frame memory. The SGL may have more than one chain or link. Each chain buffer may be similar in size to the message frame. When the host driver chains or links multiple memory locations together, the host driver may use the chain element to point to the next memory location in the chain. The first chain element is generally located at the offset (e.g., a number of 32-bit words) from the start of the message frame described in the chain offset field of the message header. The simple element preceding the chain element generally has the LastElement (LE) bit set in the FLAGS field. When the LE bit is set, the LE bit generally indicates that the simple element is the last simple element of the current chain segment.

When multiple chain segments are used, the Next Chain Offset field in the chain element may contain the location of the next chain element in the chain buffer described by the current chain element. The last chain element in the sequence generally has the Next Chain Offset field set to zero. Setting the Next Chain Offset field to zero generally indicates that the chain element is the last chain in the sequence. The last simple element in the entire sequence of chains and buffers generally has the EndOfList (EOL) bit set in the FLAGS field indicating that the element is the last simple element in the entire SGL. The last simple element may also have the LE and EOB bits set indicating that the element is the last simple element in the current segment and the last of the current buffer.

In one example, the maximum size chain buffer an IO controller handles is generally the message frame size. The maximum number of chain buffers may be identified, in one example, by a Max Chain Depth field of an IOCFacts message. The host driver generally honors the values and generally does not exceed the maximums.

Figure 4:
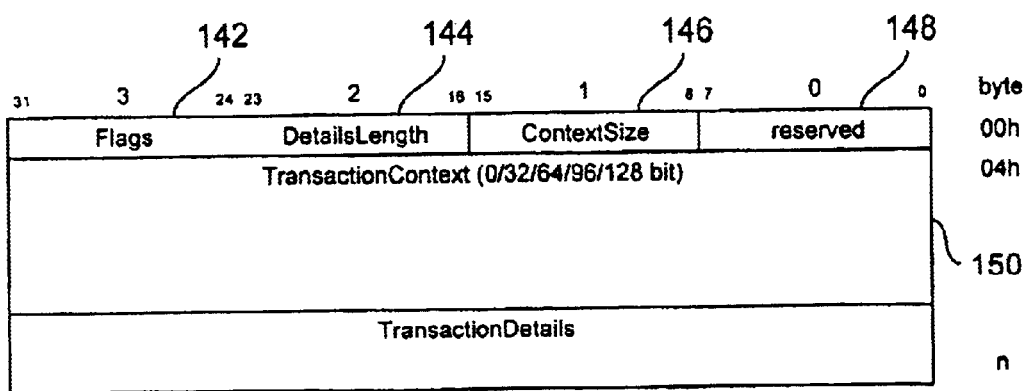
FIG. 4 is a block diagram illustrating a transaction context SG element in accordance with a preferred embodiment of the present invention.

Referring to FIG. 4, a block diagram illustrating a transaction context SG element 140 implemented in accordance with a preferred embodiment of the present invention is shown. The transaction context element generally correlates the transaction context with the elements that follow it. The transaction context element may be used for local area network (LAN) buffer management. However, the transaction context element may also be used elsewhere. In general, the use of transaction context elements may be based on a given message definition.

The transaction context element 140 may have a field 142, a field 144, a field 146, a field 148, a filed 150, and a field 152. The field 142 may be implemented as a FLAGS field.

The field 144 may be implemented as a details length field. The field 146 may be implemented as a context size field. The field 148 may be implemented as a reserved field. The field 150 may be implemented as a transaction context field. The field 152 may be implemented as a transaction details field.

The field 142 may contain a number of bits that may be used as flags. In one example, the number of bits may be eight. An example of a number of flags that may be implemented in the field 132 may be summarized in the following TABLE 3:

TABLE 3

| Bit | Flag | Description |
| --- | --- | --- |
| 7 | LastElement | 0 - Not the last element of the current segment.<br>1 - Last non-chain element of the current segment |
| 6 | Reserved | generally set to a logical LOW, or "0." |
| 5, 4 | ElementType | 00 - Transaction context element type |
| 3 :: 0 | Reserved | generally set to a logical LOW, or "0." |

The field 144 generally contains the length of the field 152 in bytes. The length in the field 144 is generally divisible by 4. The field 146 generally contains the size of the field 150 in bytes. The field 146 generally has a value of 0, 4, 8, 12, or 16. The field 150 generally contains a host generated value that generally remains with an associated buffer. The value is generally returned to the host with the associated buffer. The field 152 generally contains protocol specific information.

In one example, the transaction context element 140 may describe image placement and size when uploading or downloading a firmware or BIOS image (segment). When the transaction context element is used to describe image placement and size, the field 150 may have a value of zero and the field 152 may contain a value representing an image offset and a value representing an image size.

In another example, the transaction context element 140 may describe (i) a buffer context (e.g., using the field 150) and destination address (e.g., using the field 152) for packets that are sent in a message or (ii) a bucket context (e.g., using only the field 150) for packets that are received in a message.

Figure 5:
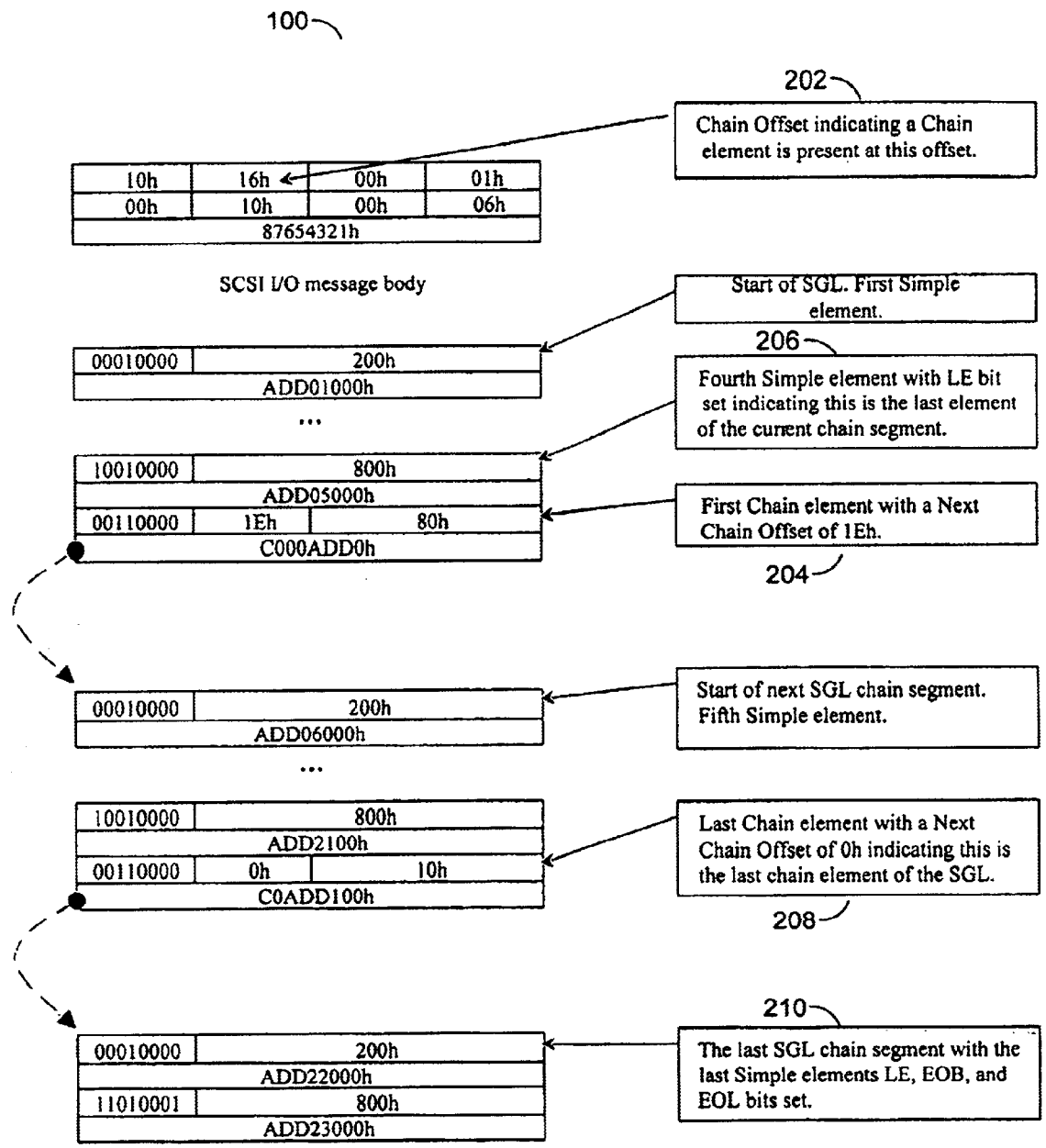
FIG. 5 is a flow diagram illustrating an example SCSI I/O message with a chained SGL in accordance with a preferred embodiment of the present invention.

Referring to FIG. 5, a memory diagram 200 illustrating an example 96 byte SCSI I/O message with a chained SGL is shown. The message header chain offset field may have, in one example, a value of 16h. The value 16h may indicate that (i) the message has a chained SGL and (ii) the chain element is at offset 16h double words (32-bit words) from the start of the message frame (e.g., the block 202). The next chain offset field of the first chain element may have a value of 1Eh. The value 1Eh may indicate that the chain buffer pointed to by the first chain element contains a chain element at 1Eh double words from the start of the first chain buffer (e.g., the block 204).

The simple element preceding a chain element may have the Last_Element (LE) bit set indicating that the simple element is the last simple element of the current chain segment (e.g., the block 206). The last chain element in the sequence generally has a next chain offset field of zero. The value zero in the next chain offset field may indicate that the chain element is the last chain element in the sequence (e.g., the block 208). The last simple element of the entire list generally has the LE, the EOB, and the EOL bits set. Setting the LE, the EOB, and the EOL bits may indicate that the simple element is the last simple element of the entire SGL (e.g., the block 210).

The present invention may improve existing chaining methods by creating a chain offset field in the message header. When the host or requester creates a message that does not fit into a single message frame, the message may be continued by writing the rest of the information into another frame and chaining or linking the frames together. The host will generally insert a chain SG element in the first message frame that describes the physical address of the linked or next frame. The host then fills in the chain offset field of the message header with the number of 32-bit words to where the chain SG element starts in the message frame.

The present invention may greatly simplify checks for chains for dedicated hardware components and embedded firmware by giving both a simple check to make in the message frame header (e.g., the chain offset field). When the chain offset field is zero, there is generally no chain. When the chain offset field is non-zero, the value in the chain offset field is generally the offset in 32-bit words from the start of the message to the chain element.

While the invention has been particularly shown and described with reference to the preferred embodiments thereof, it will be understood by those skilled in the art that various changes in form and details may be made without departing from the spirit and scope of the invention.

What is claimed is:

1. A message-based I/O architecture comprising:
   a list describing physical addresses of one or more segments of a message; and
   a message header configured to (i) indicate whether the list comprises a single segment or a plurality of segments and (ii) provide information for linking the list when the list comprises the plurality of segments.

2. The message-based I/O architecture according to claim 1, wherein the list comprises a plurality of segments.

3. The message-based I/O architecture according to claim 1, wherein the list comprises a scatter gather list.

4. The message-based I/O architecture according to claim 1, wherein the message header comprises a chain offset field.

5. The message-based I/O architecture according to claim 4, wherein the chain offset field comprises a memory pointer.

6. The message-based I/O architecture according to claim 4, wherein the chain offset field comprises (i) a null value when said list comprises the single segment and (ii) a value representing a location of a chain element, when said list comprises the plurality of segments.

7. The message-based I/O architecture according to claim 6, wherein said location is within a message frame containing said message header.

8. The message-based I/O architecture according to claim 7, wherein said value representing the location of the chain element represents a number of double words from the beginning of said message frame to the chain element.

9. The message-based I/O architecture according to claim 1, wherein said message-based I/O comprises one or more SCSI I/O messages.

10. The message-based I/O architecture according to claim 1, wherein said message header comprises a predetermined number of bytes at a beginning of a message frame.

11. The message-based I/O architecture according to claim 1, wherein said list comprises one or more elements selected from the group consisting of a simple element, a chain element, and a transaction context element.

12. The message-based I/O architecture according to claim 11, wherein the simple element is configured to identify a single buffer segment in a contiguous physical memory.

13. The message-based I/O architecture according to claim 11, wherein the chain element is configured to identify a location in a physical memory of a next segment of the list.

14. The message-based I/O architecture according to claim 1, wherein said message comprises a plurality of message frames.

15. The message-based I/O architecture according to claim 13, wherein:
   said chain element is further configured to indicate whether (i) the next segment is a last segment of the list or (ii) the next segment contains another chain element.

16. The message-based I/O architecture according to claim 11, wherein the transaction context element is configured to assign a transaction context to one or more simple elements.

17. A message-based I/O architecture comprising:
   means for describing physical addresses of one or more segments of a message comprising one or more message frames;
   means for indicating whether said message comprises one segment or a plurality of segments; and
   means for linking said plurality of segments, when said message comprises said plurality of segments.

18. A method for chaining a scatter gather list for a message-based I/O that does not fit in a single message frame comprising the steps of:
   (A) configuring a message header of the scatter gather list for the message-based I/O to indicate whether the scatter gather list comprises one segment or a plurality of segments, wherein each segment comprises a separate message frame of said message-based I/O; and
   (B) providing chaining information for chaining the segments, when the scatter gather list comprises the plurality of segments.

19. The method according to claim 18, wherein the step (A) comprises the sub-step of:
   generating said scatter gather list.

20. The method according to claim 18, wherein the step (A) comprises the sub-steps of:
   setting a field of said message header to a null value when the scatter gather list is in a single segment; and
   setting the field of the message header to a value representing a location of said chaining information, when the scatter gather list is in said plurality of segments.

21. The method according to claim 18, wherein the step (B) comprises the sub-step of:
   inserting a chain element in one or more of the plurality of segments.

22. The method according to claim 21, wherein the step (B) further comprises the sub-steps of:
   setting a field of the chain element to a value representing a location of a chain element in a next segment when the next segment is not the last segment of the scatter gather list; and
   setting the field of the chain element to a null value when the next segment is the last segment of the scatter gather list.

23. The method according to claim 22, wherein the value representing the location of the chain element in the next segment comprises an offset expressed as a number of double words from a beginning of the message frame containing the next segment of the scatter rather list.

24. The method according to claim 18, further comprising the step of:
   detecting a chained message by examining a chain offset field of said message header.

* * * * *